Patented May 13, 1924.

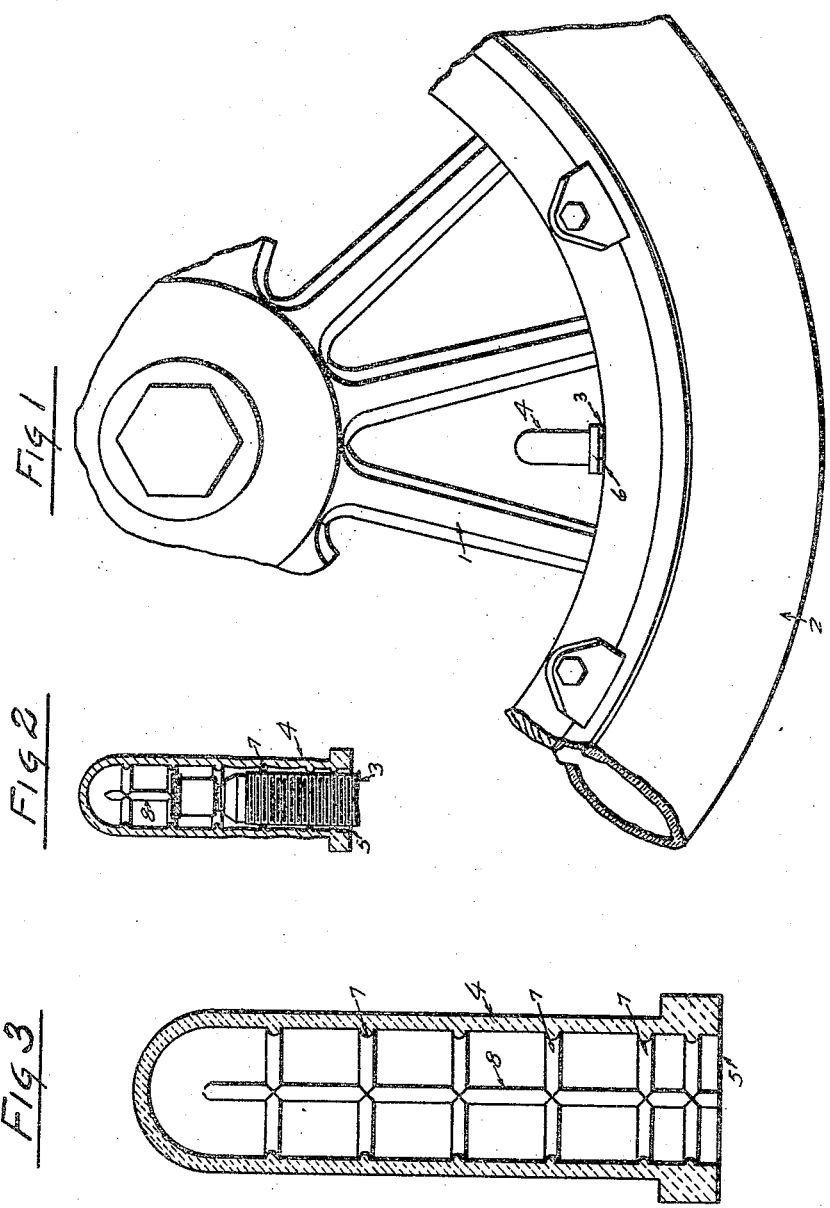

1,493,764

UNITED STATES PATENT OFFICE.

THERON R. PALMER AND ALBERT E. CALDWELL, OF ERIE, PENNSYLVANIA, ASSIGNORS TO CONTINENTAL RUBBER WORKS, OF ERIE, PENNSYLVANIA, A CORPORATION OF PENNSYLVANIA.

VALVE-STEM CAP.

Application filed March 22, 1921. Serial No. 454,578.

*To all whom it may concern:*

Be it known that we, THERON R. PALMER and ALBERT E. CALDWELL, citizens of the United States, residing at Erie, in the county of Erie and State of Pennsylvania, have invented new and useful Improvements in Valve-Stem Caps, of which the following is a specification.

This cap is designed to house the valve stems of tires on automobiles and similar vehicles in the usual manner. The cap is formed of rubber and one of the purposes of the invention is to so form the cap that it may be readily put in place on the valve stem and still have sufficient engagement with the stem to prevent its accidental displacement.

The invention is illustrated in the accompanying drawings as follows:—

Fig. 1 shows a part of an automobile wheel with the cap in place.

Fig. 2 a central section of the cap with the stem in place in the cap.

Fig. 3 an enlarged central section of the cap.

1 marks the wheel, 2 a tire on the wheel, and 3 the usual valve stem extending from the tire to within the felloe of the wheel.

The cap 4 is formed of rubber and has the usual shape of caps of this character, the inner end 5 being adapted to seat on the usual clamping nut 6 on the stem. Annular ribs 7 are arranged at intervals along the inner periphery of the wall of the cap and engage the stem successively as the cap is forced in place over the stem. These annular ribs thus arranged at intervals sufficiently grip the stem and prevent the accidental displacement of the cap. On the other hand by forming a plurality of ribs and successively as shown no one of the ribs offers so great a resistance to the necessary enlargement to pass over the end of the stem as to make the attachment of the cap inconvenient. It will be understood that the greatest resistance is at the moment when one of the annular ribs is expanded sufficiently to pass over the stem. In order to assist in expanding the ribs so as to permit the entrance of the stem as the cap is put in place we prefer to provide also the axial ribs 8 which guide the stem and make its insertion in the cap somewhat easier.

It will be understood that the cap is formed of elastic rubber so that it will readily accommodate itself to the stem.

What we claim as new is:—

A valve stem cap formed of elastic rubber and having an annular wall closed at the outer end and open at the inner end; and annular ribs arranged at intervals along the inner periphery of the wall and adapted to engage successively an inserted stem, said annular ribs being connected by axial ribs.

In testimony whereof we have hereunto set our hands.

THERON R. PALMER.
ALBERT E. CALDWELL.